No. 708,751. Patented Sept. 9, 1902.
C. H. ARCHER.
DADO CUTTER.
(Application filed Apr. 21, 1902.)
(No Model.)
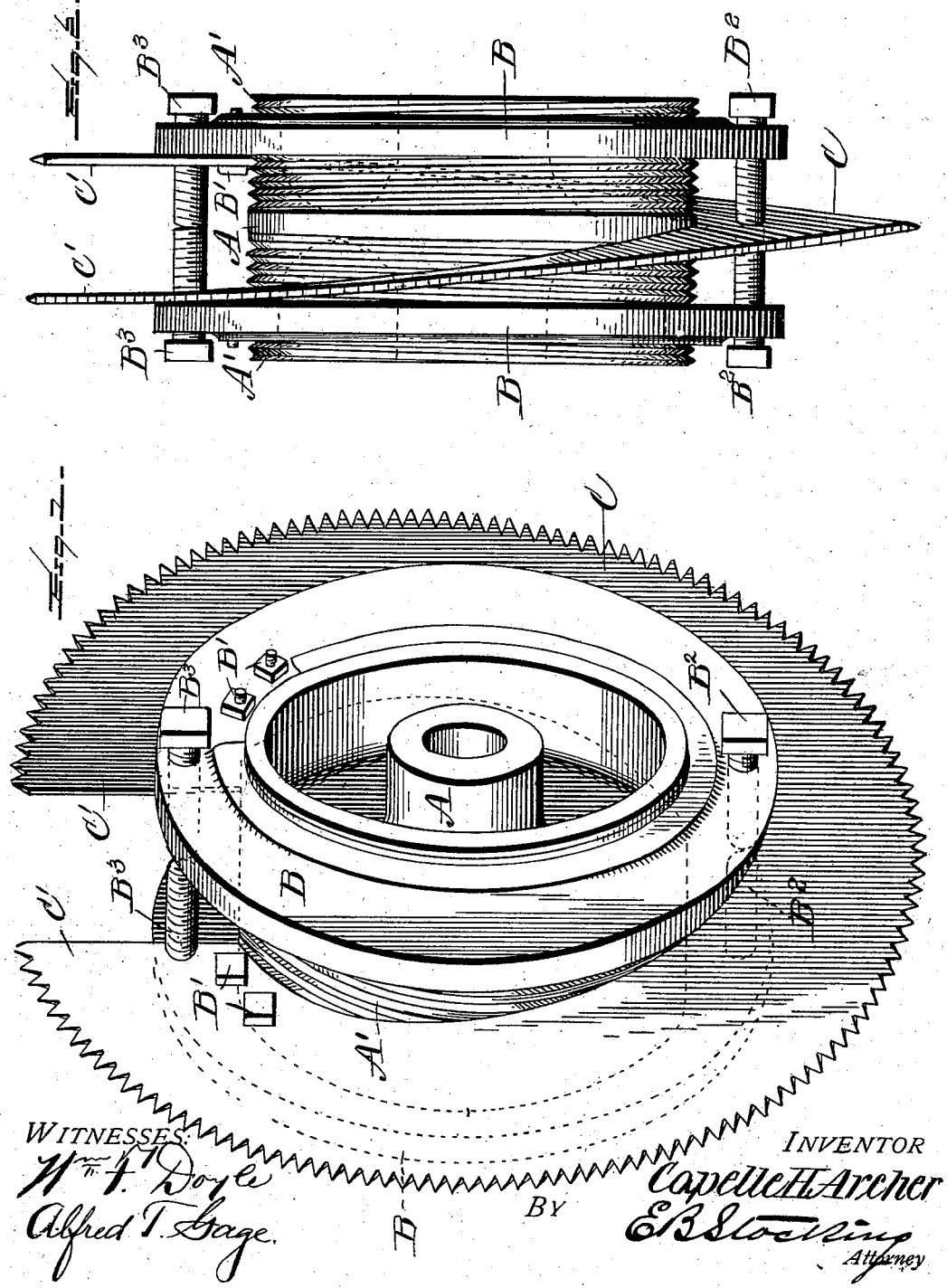

UNITED STATES PATENT OFFICE.

CAPELLE H. ARCHER, OF RICHMOND, VIRGINIA, ASSIGNOR OF ONE-HALF TO H. S. WINSTON, OF RICHMOND, VIRGINIA.

DADO-CUTTER.

SPECIFICATION forming part of Letters Patent No. 708,751, dated September 9, 1902.

Application filed April 21, 1902. Serial No. 104,009. (No model.)

*To all whom it may concern:*

Be it known that I, CAPELLE H. ARCHER, a citizen of the United States, residing at Richmond, in the county of Henrico, State of Virginia, have invented certain new and useful Improvements in Dado-Cutters, of which the following is a specification, reference being had therein to the accompanying drawings.

This invention relates to a dado-cutter, and particularly to a structure embodying an adjustable saw or cutter for cutting different widths of grooves by the use of a single circular saw.

The invention has for its object to provide a circular saw split at one portion and having the opposite ends thereof separated and secured to suitable flanges, while the diametrically opposite point is centered between said flanges.

A further object of the invention is to provide for the adjustment of said flanges upon a collar, so that the distance between the separated ends of the saw may be varied and the width of cut thereby adjusted.

Other and further objects and advantages of the invention will be hereinafter set forth and the novel features thereof defined by the appended claims.

In the drawings, Figure 1 is a perspective of the cutter, and Fig. 2 an elevation thereof.

Like letters of reference refer to like parts in the figures of the drawings.

The letter A designates a collar, which is adapted to be secured to the shaft or journal of a saw in any desired manner and is provided at opposite sides of its center with oppositely-threaded faces A', adapted to receive the flanges B, which are correspondingly threaded. Between these flanges the saw C, forming the cutter, is disposed and comprises a circular or annular saw split or separated at one point and spirally disposed by having the separated ends secured to the flanges B by any desired means—for instance, the bolts B', passing through the flange and saw—while the diametrically opposite point of the saw is centered between the flanges by means of adjusting-screws $B^2$, which clamp the saw between the same and also retain the flanges against movement. Other similar screws $B^3$ may be disposed at any desired point on the flanges to contact with each other for the purpose of retaining the flanges at other points by the contact of the screws with each other.

It will be seen that by adjusting the flanges B upon the threaded faces A' the distance between the separated ends C' of the saw may be varied and the cut thereof correspondingly adjusted. When this adjustment has been effected the ends of the saw are again secured to the flanges and the opposite sides of the saw centrally clamped between the screws $B^2$, so that the width of cut is substantially the distance between the flanges. It will be seen that with this construction a dado-cutter can be formed at much less cost than ordinarily and can be kept in order at a minimum expense, as it requires only a single saw, which can be adjusted more quickly and easily than when two or more are used. It will also be apparent that any desired means may be employed other than that illustrated for supporting and adjusting the saw without departing from the spirit of the invention as defined by the appended claims.

Having described my invention and set forth its merits, what I claim, and desire to secure by Letters Patent, is—

1. In a dado-cutter, a supporting-body, a circular saw having separated end portions secured to said support on opposite sides of a diametrically opposite point of the saw, and means for adjusting said end portions toward and from each other; substantially as specified.

2. In a dado-cutter, a support provided with adjustable flanges thereon, a circular saw having its body centrally held by said flanges, and separated end portions secured to said flanges on opposite sides of the holding-point of said body; substantially as specified.

3. In a dado-cutter, a supporting-collar, a spirally-disposed saw carried on the periphery of said collar, and means engaging the free ends of the saw to adjust the same toward and from each other; substantially as specified.

4. In a dado-cutter, a supporting-collar, a spirally-disposed saw carried on the periphery of said collar, adjustable flanges secured to said collar, and means carried thereby for securing the saw between said flanges; substantially as specified.

5. In a dado-cutter, a supporting-collar having oppositely-extending threads upon its periphery, flanges oppositely threaded upon said periphery, and a circular saw disposed centrally between said flanges at one point and having supporting ends secured to said flanges at an opposite point; substantially as specified.

6. In a dado-cutter, a supporting-collar having oppositely-extending threads upon its periphery, flanges oppositely threaded upon said periphery, a circular saw disposed centrally between said flanges at one point and having supporting ends secured to said flanges at an opposite point, opposite adjusting-screws carried by said flanges to engage the saw-body located centrally between the same, and securing means passing through said flanges to hold the free ends of the saw in contact therewith; substantially as specified.

7. A dado-cutter having a supporting-body, opposite adjustable flanges threaded upon said body, and a saw extending circumferentially thereof and having its free ends secured to said flanges in planes parallel to each other; substantially as specified.

8. A dado-cutter having a supporting-body, a saw extending circumferentially thereof having its free ends secured in planes parallel to each other, and holding means for the free ends of said saw adapted to adjust the same toward and from each other; substantially as specified.

In testimony whereof I affix my signature in presence of two witnesses.

CAPELLE H. ARCHER.

Witnesses:
   CHAS. W. SELDEN,
   N. W. HUBARD.